US008861010B2

(12) United States Patent
Suzuki

(10) Patent No.: US 8,861,010 B2
(45) Date of Patent: Oct. 14, 2014

(54) NOTIFYING A PRINT CLIENT OF AN END OF AN IMAGE PROCESS ON PRINT DATA

(71) Applicant: Katsunori Suzuki, Tokyo (JP)

(72) Inventor: Katsunori Suzuki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/956,890

(22) Filed: Aug. 1, 2013

(65) Prior Publication Data

US 2013/0314734 A1  Nov. 28, 2013

Related U.S. Application Data

(63) Continuation of application No. 12/823,708, filed on Jun. 25, 2010, now Pat. No. 8,526,041.

(30) Foreign Application Priority Data

Jun. 26, 2009   (JP) .................................. 2009-152308

(51) Int. Cl.
*G06F 3/12* (2006.01)

(52) U.S. Cl.
CPC ............ *G06F 3/1211* (2013.01); *G06F 3/1254* (2013.01); *G06F 3/1285* (2013.01); *G06F 3/1204* (2013.01)
USPC ........................................................ 358/1.15

(58) Field of Classification Search
CPC .................................................... G06F 3/1285
USPC ........................................................ 358/1.15
See application file for complete search history.

(56) References Cited

U.S. PATENT DOCUMENTS

| 2006/0082807 A1* | 4/2006 | Tanaka et al. ................. 358/1.15 |
| 2007/0008567 A1* | 1/2007 | Choi ............................ 358/1.13 |
| 2009/0033976 A1* | 2/2009 | Ding ............................ 358/1.15 |
| 2010/0134818 A1 | 6/2010 | Minamizono et al. |
| 2010/0309500 A1 | 12/2010 | Suzuki |
| 2010/0315672 A1 | 12/2010 | Suzuki |

FOREIGN PATENT DOCUMENTS

| JP | 11015610 A | 1/1999 |
| JP | 2003-140867 | 5/2003 |
| JP | 2008-204389 A | 9/2008 |

OTHER PUBLICATIONS

Japanese Office Action mailed May 14, 2013 in Japanese Patent Application No. 2009-152308 filed Jun. 26, 2009.

\* cited by examiner

*Primary Examiner* — Eric A Rust
(74) *Attorney, Agent, or Firm* — Oblon, Spivak, McClelland, Maier & Neustadt, L.L.P.

(57) ABSTRACT

Disclosed is a data processing apparatus including an application execution unit that transmits job data; a print-request-source notification unit invoked by the application execution unit to report print-request-source information specifying a print request source; a virtual printer driver that is invoked upon receiving the job data, extracts job information specifying print settings from the job data, generates a work space for image conversion, and generates drawing data of a higher image format from the job data in the work space; and a transmission processing unit that is generated as a private instance for the job data, selects a printer driver corresponding to output-destination printer information associated with a client or a user of the client, instructs the selected printer driver to print the drawing data, and displays transmission destination information and/or print information determined for the job data on the print request source.

10 Claims, 10 Drawing Sheets

| IDENTIFICATION VALUE | OUTPUT CONTENTS | PRINTER NAME |
|---|---|---|
| USER 1 | LABEL PRINT | LOCAL PRINTER A |
| USER 2 | FORM PRINT 1 | LOCAL PRINTER B |
| USER 3 | FORM PRINT 2 | LOCAL PRINTER C |
| USER 3 | IMAGE PRINT | LOCAL PRINTER D |
| ... | ... | ... |

400B

| IDENTIFICATION VALUE | PRINTER NAME |
|---|---|
| USER 1 | LOCAL PRINTER A |
| USER 2 | LOCAL PRINTER B |
| USER 3 | LOCAL PRINTER C |
| ... | ... |

400A

| IDENTIFICATION VALUE | PRINTER NAME |
|---|---|
| 192.168.28.21 | LOCAL PRINTER A |
| 192.168.8.230 | LOCAL PRINTER B |
| 192.168.240.1 | LOCAL PRINTER C |
| ... | ... |

FIG.5

| PROCESS ID | TRANSMISSION-DESTINATION SPECIFYING INFORMATION | USER INFORMATION | TERMINAL INFORMATION | PRINT SETTING INFORMATION | JOB INFORMATION |
|---|---|---|---|---|---|
| PID_001 | LOCAL PRINTER A | USER 1 | 192.168.2.210 | COLOR | 2 PAGES |
| PID_002 | LOCAL PRINTER B | USER 2 | 192.168.2.130 | GRAY SCALE | 30 PAGES |
| PID_003 | LOCAL PRINTER C | USER 3 | 192.168.28.52 | MONOCHROME | 4 PAGES |
| PID_004 | LOCAL PRINTER D | USER 4 | 192.168.12.4 | MONOCHROME | 1 PAGE |
| PID_005 | LOCAL PRINTER E | USER 5 | 192.168.28.42 | MONOCHROME | 12 PAGES |
| ⋮ | ⋮ | ⋮ | ⋮ | ⋮ | ⋮ |

| PROCESS ID | PRINT-REQUEST-SOURCE INFORMATION | | |
|---|---|---|---|
| | LOGIN USER ID | USER RIGHT | SESSION ID |
| PID_001 | USER 1 | Admin | 0001 |
| PID_002 | USER 2 | Power User | 0012 |
| PID_003 | USER 3 | Standard User | 1001 |

NOTIFYING A PRINT CLIENT OF AN END OF AN IMAGE PROCESS ON PRINT DATA

CROSS-REFERENCE TO RELATED APPLICATIONS

This application is a continuation of U.S. patent application Ser. No. 12/823,708, filed Jun. 25, 2010, which is based on Japanese Priority Application No. 2009-152308 filed on Jun. 26, 2009, the entire contents of both of which are incorporated herein by reference.

BACKGROUND OF THE INVENTION

1. Field of the Invention

The present invention relates to a print output management technology, and more specifically, to a data processing apparatus for efficiently controlling a print output destination in association with an information processing apparatus that has issued a print request. In addition, the present invention relates to a program and a recording medium used for the data processing apparatus.

2. Description of the Related Art

With improvements in computer performance and the spread of network technology, a known information processing apparatus provided in an office is connected to a network and accesses the Internet, a SAN (Storage Area Network), a server, a network printer, etc., to perform various processing. The connection of an information processing apparatus to a network can provide the expansion of its access performance. On the other hand, the wide access range of an information processing apparatus may cause some problems. For example, in order to print a document file, the information processing apparatus of a company, a hospital, an inspection organization, a public office, or the like, which handles personal information and confidential information, is required to dynamically select output data in accordance with the information level of a printer.

Under such a circumstance, with improvements in plug-and-play technology such as UPnP and Bonjour, plural accessible printers connected to a network are displayed on the printer dialogue of a conventional information processing apparatus in a selectable manner at the time of selecting a print output. Therefore, when it is required to switch a print output destination for a specific output purpose, there is a likelihood of specifying a wrong output destination under such a conventional printer selection method.

Furthermore, with an improvement in the print processing performance of an information processing apparatus and a printer, processing for converting into print data is accelerated. Therefore, once a print output is selected, data other than those left in a print queue are output to a wrong output destination printer even if the cancellation of the data is attempted. Accordingly, a user who handles a document file that contains personal information and a high degree of confidentiality may cause a serious problem when specifying a wrong output destination printer. In order to solve such an inconvenience, the print dialogue of a client computer (hereinafter simply referred to as a client) can be configured so as not to display all printers available on a network.

However, this method is not effective. That is, unified print output control cannot be performed on a printer network that generally includes printers provided from plural different vendors and where individual settings may be required for a client.

Up until now, various output destination management technologies of a document file have been known. For example, Patent Document 1 has proposed a technology for automatically selecting an output printer in accordance with the status of the printer such as "turned off" and "paper out."

The system described in Patent Document 1 switches to another printer as an output destination in accordance with the status of the printer. Therefore, a print output can be performed efficiently. However, the system described in Patent Document 1 is aimed at automatically switching an output destination printer in accordance with the status of the printer but not aimed at managing an output destination that a specific information processing apparatus and a user can use.

Moreover, with only the selection of another printer in accordance with the status of the printer, a print output cannot be controlled. That is, when the printer is not in an error status even if a client issues an output request to a wrong printer, the print output cannot be actually performed.

In addition, it may also be possible for a printer server, a terminal server, or the like to determine a user identification value or an IP address with which a print instruction has been issued, or contents of print data so as to collectively manage print output destinations. However, in a system in which an application generates a spool file and an operating system (OS) performs the drawing process of the spool file, a desired operation cannot be performed unless an IP address is identified at an appropriate timing. Moreover, when a data processing apparatus such as a terminal service and a remote desktop is used, a terminal operated by a user, a computer in which an application operates, and a computer in which a system for drawing a spool file operates have their own IP addresses. Therefore, in this case, processing becomes too complicated. A system is not realized which not only operates under a simple system but also can accurately manage output destinations under such a complicated system. Further, a printer driver is generally managed by an operating system (OS). Therefore, when the printer driver is exclusively used by one print job, the printer driver cannot start the processing of a subsequent print job, which in turn causes a bottleneck of throughput.

After the printer driver completes image processing and output data are output to a specified printer, the printer driver starts the processing of the subsequent print job. Therefore, if a print error about output data that have been transmitted is caused by the specified printer, a data processing apparatus such as a printer server and a terminal server is required to have an error notification management module separated from the printer driver so as to perform error notification.

In other words, the conventional system makes it possible to select an output destination printer in accordance with the status of a printer and allows a user to specify which printer data are output prior to printing. However, if the user issues a print instruction specifying a wrong output destination, a document file is output to an unintended output destination printer, which results in the leakage of personal information and confidential information. Moreover, under the conventional system, even if a wrong output destination printer is selected, the output destination printer is specified in association with a user who accesses an information processing apparatus, and data are reliably output to an output destination printer set for the information processing apparatus and the user. Therefore, the leakage of information on a document file having a high degree of confidentiality must be prevented. Further, in this case also, an accurate operation is demanded even under a complicated system such as a terminal service and a remote desktop.

Further, in case that there are so many clients and a large number of full-color images are printed, it is assumed that time until control is returned to an application since the issuance of an instruction for printing print data (RTA: Return to Application) and time required for print processing increase. Therefore, a technology that manages print output destinations and performs print output under high security while dealing with this problem is also demanded. In addition, even if printers provided from plural vendors exist together, print output control must be efficiently performed not only for a fat client but also for a thin client without greatly modifying or integrating a program.

Further, in a system in which printed matter is sorted and printed, it is possible to output the printed matter to any page printer within a network. Therefore, particularly when this print system is used by plural users, it is necessary to notify the user who has issued a print instruction from which page printer the printed matter is to be output. Moreover, in this system in which plural users coexist, it is necessary to appropriately notify the user who has performed print processing of a print processing result such as successful printing or unsuccessful printing of the printed matter due to an error caused in the page printer or the like. Particularly, even a complicated system such as a terminal service and a remote desktop is also required to accurately notify the user who has issued a print instruction of the print processing result.

Further, when the print processing is performed in the above print system, a user is urged to use a page printer suitable for printing the printed matter in accordance with the performance of the page printer or the like. In addition, the user is urged to change print-setting conditions in accordance with print-setting information such as color printing, one-side printing, and page layouts. That is, it is necessary to reduce detrimental environmental effects and costs. In some cases, it is necessary to notify the user of the print processing result after the above changes are forcibly made.

Patent Document 1: JP-A-2003-140867

SUMMARY OF THE INVENTION

The present invention has been made in light of the above problems of the conventional technologies and may provide an information processing apparatus that allows a user to output data to an output destination set as an output destination printer in association with the information processing apparatus or a user who accesses the information processing apparatus regardless of printer output settings of the information processing apparatus. The present invention may also provide a print output control method, a program, and a recording medium used for the information processing apparatus. Moreover, the present invention may provide an information processing apparatus capable of controlling an output destination printer regardless of whether vendors are the same or different under a circumstance where printers provided from the vendors exist together. The present invention may also provide a program and a recording medium used for the information processing apparatus. Moreover, the present invention may provide an information processing apparatus capable of notifying a user of various information items on print processing. The present invention may also provide a program and a recording medium used for the information processing apparatus.

According to an aspect of the present invention, there is provided a data processing apparatus that receives job data and prints the job data. the apparatus includes an application execution unit that transmits the job data to the data processing apparatus; a print-request-source notification unit that is included in the application execution unit and invoked by the application execution unit to report print-request-source information for specifying a print request source; a virtual printer driver that is invoked upon receiving the job data from the application execution unit, extracts job information specifying print settings from the job data, generates a work space to perform image conversion, and generates drawing data of a higher image format from the job data in the work space; and a transmission processing unit that is generated as a private instance for the job data, selects a printer driver corresponding to output-destination printer information associated with a client or a user of the client, instructs the selected printer driver to print the drawing data of the higher image format with the print settings specified by the job information, and displays transmission destination information and/or print information determined for the job data on the print request source specified by the print-request-source information.

According to another aspect of the present invention, there is provided a data processing apparatus that receives job data and prints the job data. The apparatus includes an application execution unit that transmits the job data to the data processing apparatus; a print-request-source notification unit that is included in the application execution unit and invoked by the application execution unit to report print-request-source information for specifying a print request source; a virtual printer driver that is invoked upon receiving the job data from the application execution unit, extracts job information specifying print settings from the job data, generates a work space to perform image conversion, and generates drawing data of a higher image format from the job data in the work space; a transmission processing unit that is generated as a private instance for the job data, selects a printer driver corresponding to output-destination printer information associated with a client or a user of the client, instructs the selected printer driver to print the drawing data of the higher image format with the print settings specified by the job information, and transmits transmission destination information and/or print information determined for the job data; and a display unit that receives the transmission destination information and/or the print information from the transmission processing unit and displays the received transmission destination information and/or the print information on the print request source specified by the print-request-source information.

Other objects, features and advantages of the present invention will become more apparent from the following detailed description when read in conjunction with the accompanying drawings.

BRIEF DESCRIPTION OF THE DRAWINGS

FIG. 4 shows a corresponding table 400 managed by a transmission destination control unit 242 according to the embodiment;

FIG. 5 shows a transmission management table 500 used in the embodiment;

FIG. 6 shows a display destination management table 600 used in the embodiment;

DETAILED DESCRIPTION OF THE PREFERRED EMBODIMENTS

Figure 1:
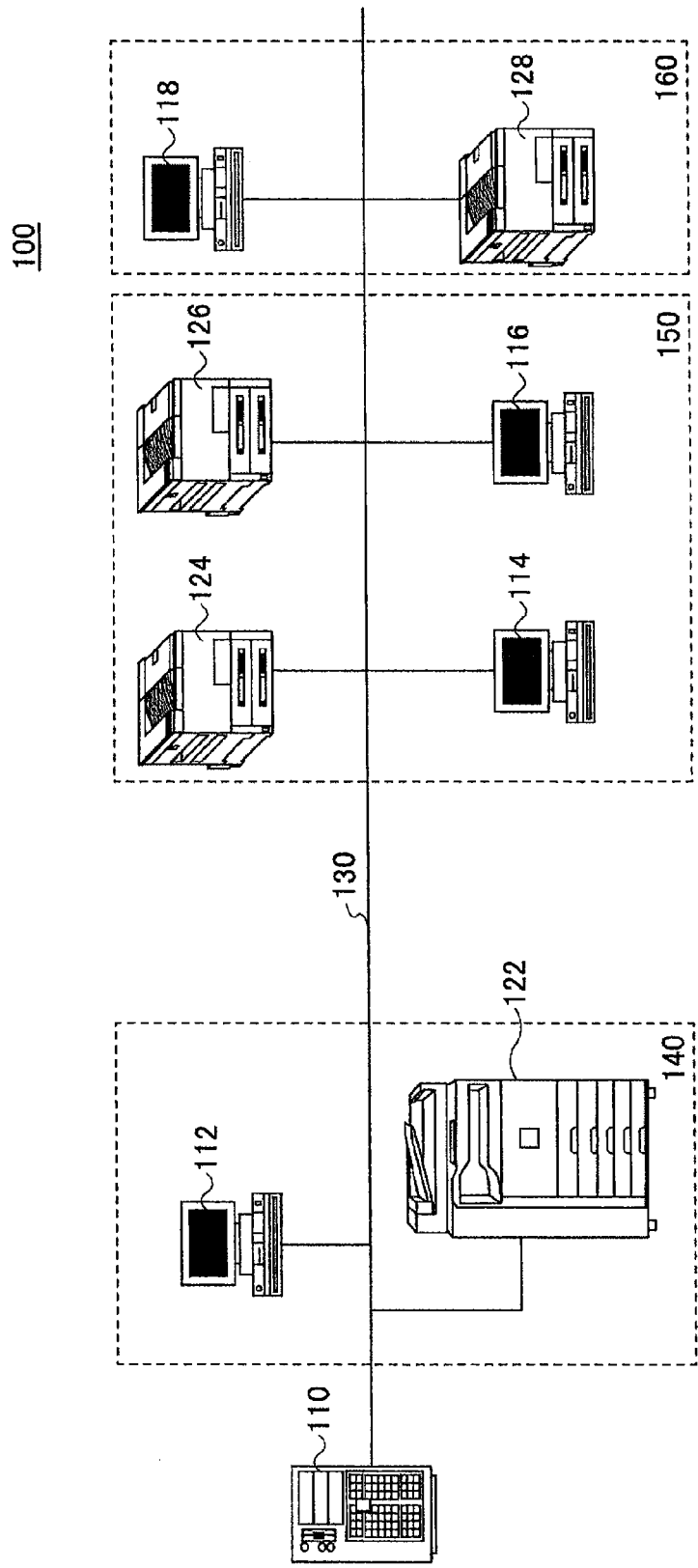
FIG. 1 shows a printer network 100 including a data processing apparatus 110 according to an embodiment of the present invention.

Next, the present invention is explained with reference to an embodiment but not limited to it. FIG. 1 shows a printer network 100 including a data processing apparatus 110 according to the present embodiment. The printer network 100 is configured in such a manner that plural clients 112, 114, 116, and 118 provided in an office or the like are connected to a network 130. The network 130 is connected to a printer server (not shown), besides the data processing apparatus 110. The printer server may manage a print request from each of the clients 112, 114, 116, and 118.

In the exemplified embodiment shown in FIG. 1, a MFP (Multi Function Printer) 122, laser printers 124 and 126, an ink jet printer 128, and the like are connected to the network 130 as remote printers. In this embodiment, the MFP 122 and the page printers 124, 126, and 128 are collectively referred to as the remote printers.

In the embodiment shown in FIG. 1, the data processing apparatus 110 acquires a print request from any of the clients 112, 114, 116, and 118 and print data corresponding to the print request, determines the remote printer allocated to the respective client 112, 114, 116, or 118, and generates RAW data corresponding to the print data for the remote printer allocated to the client involved. The generated RAW data are converted into output data after being subjected to processing for adding, for example, a PDL (Page Description Language) command, and transmitted to the designated one of the remote printers 122, 124, 126, and 128. The remote printers 122, 124, 126, and 128 correspond to the client 112, 114, 116, and 118, respectively, and execute print processing at locations where the corresponding remote printers are provided.

Note that in this embodiment, when the remote printers are allocated to the clients 112, 114, 116, and 118, identification values related to the hardware of the clients such as IP addresses, MAC addresses (Media Access Control Addresses), computer names provided for the clients, or the login names of users can be used. In this embodiment, these values are collectively referred to as output-request-source identification values. Further, in the preferred embodiment of the present invention, the clients 112, 114, and 116 have IC card readers for identifying the respective users of the clients 112, 114, and 116 and allowing any user to print with the allocated remote printer.

In the preferred embodiment, the data processing apparatus 110 configured as a server apparatus includes a single core or a multi-core CPU, a ROM, a RAM that provides an actual working memory space, a hard disk device, and the like, and controls the output destination of print data under an operating system such as Windows™ 200x server, UNIX™, or Solaris™. Further, the data processing apparatus 110 can make a transaction with the clients 112, 114, 116, and 118 by using an adequate remote connection protocol such as a RDP (Remote Desktop Protocol).

The remote printers 122, 124, 126, and 128 can be allocated to the clients 112, 114, 116, and 118 in various ways. For example, in a specific embodiment, a remote printer can be allocated to an output destination for any output-request-source identification value for inherently identifying a client or a user. Further, in another embodiment, a client group or a user group is specified, and a specific remote printer can be allocated in units of such a group. In the embodiment shown in FIG. 1, the client 112 and the remote printer 122 constitute the location 140. In this manner, the clients and the printers associated with each other constitute the locations 150 and 160. It is also possible that plural clients exist at the locations 140, 150, and 160, and plural remote printers can exist at the locations.

In this embodiment, when the printer server is connected to the printer network 100, the printer server can receive a print request from any of the clients 112, 114, 116, and 118 and transmit corresponding print data to any of the remote printers 122, 124, 126, and 128 allocated to the client 112, 114, 116, or 118 to execute a print job. The printer server may have the same configuration as that of the data processing apparatus 110 in terms of a hardware configuration and an OS configuration. Note that the printer server is not necessarily configured as a server apparatus. Instead, it can be configured so that a personal computer includes a printer server application.

The clients 112, 114, 116, and 118 have the same configuration, and each can be configured as a fat client apparatus, for example, a personal computer or a work station that includes an application program and completes various processing. When the clients 112, 114, 116, and 118 are configured as fat clients, each of the clients 112, 114, 116, and 118 has a single core or a multi-core CPU, a RAM, a ROM, a hard disk device, and a network interface card (NIC); and requests the corresponding remote printer 122, 124, 126, or 128 to perform print processing under an adequate OS such as Windows™, UNIX™, LINUX™, and MAC OS™.

Each of the clients 112, 114, 116, and 118 configured as fat clients reads an application program and data from the hard disk device or the like into the RAM and causes the CPU to execute the application program, thereby generating a document file to be printed as a document, an image, multi-media, or electronic data obtained by combining the document, the image, and the multi-media with each other.

Further, in another embodiment, the clients 112, 114, 116, and 118 can be configured as so-called thin clients. The thin clients have only the function of issuing a service request exclusively to the data processing apparatus 110, receiving a processing result, and requesting a print output, such as a network connection module, a user authentication function, and a session generation module. When the clients 112, 114, 116, and 118 are configured as thin clients, the clients 112, 114, 116, and 118 complete processing corresponding applications and then issue print requests to the data processing apparatus 110.

The data processing apparatus 110 makes it possible to give data generated in response to the request by each of the thin clients to a virtual printer driver, and perform the management of an output destination, a status, and image conversion processing for each job. The generated output data are transmitted to the remote printers corresponding to the clients 112, 114, 116, and 118 and subjected to print processing. Note that the virtual printer driver is more specifically described. In this embodiment, when many print requests are issued from a multiplicity of the clients, the virtual printer driver of the data processing apparatus 110 makes it possible to perform parallel processing of the print requests in units of jobs, thereby improving efficiency in status management as well as print efficiency. Moreover, in this embodiment, the virtual printer driver makes it possible to perform processing efficiently even if the print request is described in a higher format accompanying drawing information such as EMF (Enhanced Metafile), PDF, and XPS, besides lower image data such as a bitmap (BMP).

The network 130 can be configured with Ethernet™ such as 1000Base-TX, as an optical network, or as a wireless network with such as an IEEE 802.11 format, and perform mutual communications with packet communications based on a TCP/IP protocol. Further, the network 130 may be configured as a wide-area network such as the Internet constructed under a secure environment by a VPN (Virtual Private Network) or the like, besides a LAN.

Figure 2:
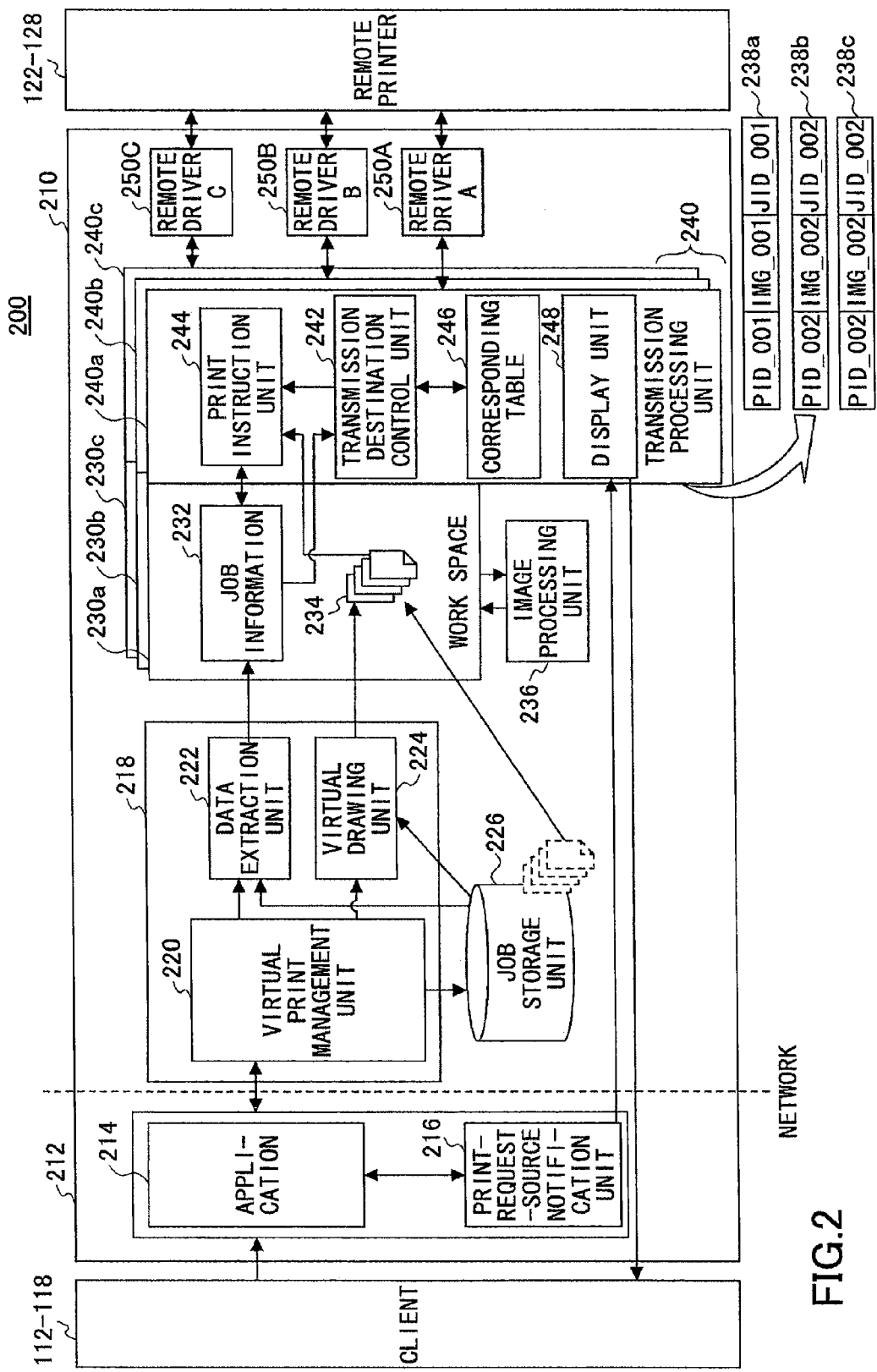
FIG. 2 is a function block 200 of the data processing apparatus 110 according to the embodiment.

FIG. 2 is a function block 200 of the data processing apparatus 110 according to this embodiment. As shown in FIG. 2, the data processing apparatus 110 includes plural function units. These function units are implemented on a computer when a program read into the RAM or the like is executed by the CPU.

As shown in FIG. 2, the data processing apparatus 110 includes a data processing unit 210 and an application execution unit 212. The data processing unit 210 and the application execution unit 212 of the data processing apparatus 110 can be integrated with each other as shown in FIG. 2. Further, in a specific embodiment, assuming that dotted lines shown in FIG. 2 are defined as a network boundary, a function unit 212 on a left side can be configured as a terminal server and a function unit 210 on a right side can be configured as the data processing apparatus 110.

The application execution unit 212 has an application 214 and a print-request-source notification unit 216, and receives a processing request and a print request from any of the clients 112, 114, 116, and 118 through the network 130, and executes processing for generating an execution result. The execution result is converted into a print job (hereinafter simply referred to as a job) after being subjected to an API call such as a GDI in response to a print instruction event by the application 214. Then, the data of the job are transmitted to the data processing unit 210.

In another embodiment, the function modules are not necessarily configured in the same manner as FIG. 2. For example, the clients 112, 114, 116, and 118 may have the functions of the application execution unit 212 and the data processing unit 210, or they may include the application execution unit 212. In other words, the clients 112, 114, 116, and 118 may be configured as so-called fat clients. In still another embodiment, the terminal server that processes a request from a thin client may have the functions of the application execution unit 212 and the data processing unit 210. Moreover, in yet another embodiment, the clients 112, 114, 116, and 118 may be thin clients, the terminal server may include the application execution unit 211, and the data processing unit 210 may be configured as a printer server. These specific embodiments may be appropriately changed in accordance with an environment where the printer network 100 is provided and a specific purpose of a user.

The application 214 is a print instruction module. In the embodiment, upon receiving a print request from any of the clients 112, 114, 116, and 118, the application 214 notifies the data processing unit 210 of the starting of a new job.

The print-request-source notification unit 216 receives, from a client, information for specifying a print request source (hereinafter referred to as print-request-source information) such as the process of the application of the print request source that has executed print processing, and transmits the print-request-source information and a process ID to a transmission processing unit 240 of the data processing unit 210. Thus, the transmission processing unit 240 is allowed to have the same right as the application of the print request source that has executed the print processing, and reliably display information for specifying a remote printer as the output destination of print data (hereinafter referred to as transmission destination information), print information, or the like on the print request source.

In a specific system, the transmission processing unit 240 is required to be generated by the application execution unit 212 so as to have the same right as the application execution unit 212 so that the transmission processing unit 240 displays transmission destination information or the like on a client as a print request source in the same manner as the application execution unit 212. To this end, the transmission processing unit 240 is generated by the print-request-source notification unit 216 of the application execution unit 212, not by a virtual printer driver 218 described below. Note that the process of displaying transmission destination information, print information, or the like on a print request source is described in detail below.

The data processing unit 210 has the virtual printer driver 218, a job storage unit 226, and the transmission processing unit 240. The virtual printer driver 218 is activated when invoked by the application 214 of the application execution unit 212, and receives job data transmitted from the application 214 to start processing. The virtual printer driver 218 generates a process ID for inherently identifying a currently-started job, and transmits the generated process ID to the print-request-source notification unit 216 of the application execution unit 212 to notify the transmission processing unit 240 of the process ID and the print-request-source information.

The job storage unit 226 temporarily stores image data 234 and job information 232 contained in job data transmitted from the application 214 at a time when the virtual printer driver 218 is invoked. The transmission processing unit 240 transmits output data to any of remote drivers 250A through 250C, while controlling the transmission destination of the output data.

In this embodiment, job data contain image data 234 and job information 232. The image data 234 can contain lower image format data such as bitmap (BMP), JPEG, and GIF or higher image format data such as EMF including a drawing code, Post Script™, PDF, and XPS. In another embodiment, the image data 234 can contain both higher image format data and lower image format data. Further, the job information 232 is such as identification values for inherently identifying the issuance source of a print request, imposing information of image data 234, margins, size settings, page numbers, and document names.

After receiving job data from the application execution unit 212, the virtual printer driver 218 generates one of private instances 240a through 240c of the transmission processing unit 240 for the job involved, and causes the one of the private instances to execute processing for determining a transmission destination. The one of the private instances 240a through 240c activated for the job acquires image data 234 from one of the work spaces 230a through 230c and executes imposing with the image processing unit 236 and allocation of print settings.

Meanwhile, the corresponding transmission processing unit, for example, the private instance 240a refers to a user name, an IP address, or the like contained in job information 232 and determines a remote printer as an output destination by referring to a corresponding table. The corresponding table is a table in which user names, values of IP addresses or the like of clients, and allocation of remote printers as output destinations are registered, and can be managed by a transmission destination control unit 242. When the transmission destination control unit 242 determines a remote printer as a transmission destination, the print instruction unit 244 acquires the data of a higher image format generated in the work space 230a and transmits the same to the determined remote driver 250A.

Further, if the remote driver 250A determined as the transmission destination has a page assignment function and an imposing function, the image processing unit 236 converts the format of image data 234 generated as a higher image format into one capable of being received by the remote driver 250A and causes the remote driver 250A to convert the job information 232 with the job information 232 specified as the function setting value of the remote driver 250A, thereby making it possible to generate RAW data. For example, in a specific embodiment, most printer drivers of Windows™ can receive EMF. Therefore, if the image data 234 are in the form of EMF, they are not required to be converted. Instead, if the job information 232 is set in a print setting structure DEV-MODE, the remote printer driver 250A can generate desired RAW data. If the remote driver 250A does not have the page assignment function and the imposing function, EMF is divided into small pieces to correspond to pages, the order of the pages is changed, and a drawing position is specified, thereby making it possible to obtain desired RAW data.

Note that the private instances 240a through 240c not only manage the remote drivers 250A through 250C, respectively, shown in FIG. 2 but also invoke the remote drivers as transmission destinations determined by the transmission destination control unit 242. In this embodiment, the job processing functions of the data processing unit 210 are divided into the virtual printer driver 218 and the transmission processing unit 240. The private instances of the transmission processing unit 240 are generated as the private instances 240a through 240c. In this manner, processing for transmitting data to a remote printer as a transmission destination is performed for each job. Accordingly, it is possible to minimize a print stoppage when an error is caused in the remote printer. For this reason, the transmission processing unit 240 is generated as a separate instance for each job in this embodiment. Therefore, in another embodiment, the transmission processing unit 240 is not necessarily generated as a separate instance. For example, the transmission processing unit 240 may be generated as a multithread (multitask) instance that performs separate processing for each job.

As a result, the transmission processing unit 240 can acquire a separate spool space for each job. Further, even if an error is caused in a specific remote printer and an error job cannot be eliminated from a printer queue, the transmission processing unit 240 can limit the trouble caused by the error to only the job of the remote printer that has experienced the error without affecting all jobs processed by the virtual printer driver 218. Note that if the data processing apparatus 110 can receive an input from a user to control processing, the application 214 can receive a mouse event or the like and issue a print instruction.

When image data 234 are color image data and configured of lower image format data such as bitmap (BMP), spool processing of the image data 234 requires time. Further, in conventional technologies, exclusive processing is performed in which a next print request is not accepted unless spool processing is completed. Therefore, particularly when the data processing apparatus 110 processes a color image of lower image format data, it causes a bottleneck with image conversion processing. Therefore, in this embodiment, the format of job data containing a color image is converted into a higher image format including as many drawing codes as possible to reduce an image data amount, and a separate work space is allocated to each job so as to shift color image data to the work spaces 230a through 230c. Accordingly, output data of a RAW format capable of being output from a remote printer as a transmission destination can be efficiently generated.

Note that a private instance as a lower program may not generally access the work spaces 230a through 230c as upper programs generated by the virtual printer driver 218. Therefore, it is necessary to design the data processing unit 210 so that the private instances can access the work spaces.

Here, the configuration of the virtual printer driver 218 is more specifically described. The virtual printer driver 218 includes a virtual print management unit 220, a data extraction unit 222, and a virtual drawing unit 224. Upon receiving job data, the virtual printer driver 218 invokes the virtual print management unit 220. Then, the virtual print management unit 220 invokes the data extraction unit 222 to separate job information 232 and image data 234 constituting the job data from each other. The image data 234 are stored in the job storage unit 226, and the job information 232 is stored in a temporary storage unit such as a RAM or a register or a non-volatile storage unit such as an EPROM or EEPROM in association with a process ID. On the other hand, the virtual print management unit 220 invokes the virtual drawing unit 224 to secure storage spaces for processing the image data 234 so as to correspond to jobs as the work spaces 230a through 230c. As the work spaces 230a through 230c, an appropriate capacity of a storage space such as the RAM managed by the data processing unit 210 is used. In this embodiment, the work spaces 230a through 230c can be referred to as, for example, virtual spoolers. The data extraction unit 222 extracts job information 232 from the job data temporarily stored in the job storage unit 226 and gives the same to the corresponding transmission destination control unit 242 among the private instances 240a through 240c of the transmission processing unit 240.

Here, a description is made assuming that the job data being processed are handled in the work space 230a. The virtual drawing unit 224 moves the image data 234 stored in the job storage unit 226 to the work space 230a and generates the drawing data of a higher image format in the work space 230a. For example, in a Windows™ system as a specific embodiment, a printer processor can copy an EMF file generated by a Spooler to a work space, and a graphic module can generate an EMF file. Referring to the job information 232, the drawing data are generated in a format in which page assignment and margin settings are performed. Note that as the image data, it is preferable to use the data of a higher image format having a size smaller than that of the data of a lower image format, thus making it possible to improve the efficiency of the processing by the data extraction unit 222 and the virtual drawing unit 224 and to reduce RTA.

After moving the image data 234 to the work space 230a, the virtual drawing unit 224 empties the job storage unit 226 and notifies the application execution unit 212 of the completion of image processing. Upon receiving the notification about the completion of the image processing from the virtual drawing unit 224, the application 214 withdraws exclusive management for the job storage unit 226 and is allowed to execute the processing of a subsequent print request. Note that various methods such as Semaphore and Synchronization Class can be used as exclusive management. In another embodiment, exclusive control can be easily performed in such a manner that a GUI (Graphical User Interface) provided by the application 214 of the application execution unit 212 is displayed so as not to receive an event.

Note that in the embodiment shown in FIG. 2, the data extraction unit 222 of the virtual printer driver 218 is described as a single function processing unit. However, in another embodiment, plural data extraction units may be mounted so as to operate parallel to each other. Consequently, it is possible to efficiently process job data containing image data 234 having many pages and a large amount of data and to reduce RTA. In this case, the data extraction units store the image data sets in the job storage unit 226 one by one under exclusive control. As the exclusive control, the above exclusive control method can be used.

The job storage unit 226 can be configured as a storage area where a printer buffer or a spool file is stored in accordance with the embodiment of the data processing unit 210, and is not limited to the mounting format of a specific OS. For example, the image data 234 moved into the work space 230a are transmitted to the image processing unit 236 of the data processing unit 210. The image processing unit 236 acquires image data and the job information 232 from the work space 230a generated for a job and executes processing such as page assignment and imposition. The private instance 240a invokes the remote driver 250A as a transmission destination determined at that point and converts the format of the received data into a RAW format inherent in each of the remote printers 122, 124, 126, and 128 by using imposition and print setting values, and transmits the output data of the RAW format to, for example, the printer 122. Further, in this embodiment, image data are stored in the job storage unit 226. However, in another embodiment, it is also possible to temporarily store job data in the job storage unit, invoke the data extraction unit to separate the job data and generate image data, give the image data to the virtual drawing unit to generate drawing data, and store the data in the work space.

In this embodiment, the image processing unit 236 can be configured as an image processing module such as a drawing module including the remote drivers 250A through 250C and a drawing processor. More specifically, the image processing unit 236 invokes the drawing processor to execute the processing if image data to be processed are of a higher image format including a drawing control code, such as EMF, PDF, PostScript™, and a vector image. Further, if image data to be processed are of a lower image format such as BMP, the image processing unit 236 can generate the output data of the RAW format by invoking the remote driver to execute image conversion and repeating the processing with one of the work spaces 230a through 230c until the generation of a raster image is completed by one of the remote drivers 250A through 250C. Moreover, the private instance 240a links the job information 232 extracted by the data extraction unit 222 to process IDs and images to generate job management lists 238a through 238c, which can be used for managing correspondence between the private instances.

In this embodiment, image data 234 may contain the data of a lower image format that do not contain drawing codes such as bitmap (BMP), JPEG, JPEG 2000, PNG, and GIF. In this embodiment, even if image data 234 contain the data of the lower image format, the work spaces 230a through 230c are generated and the processing is repeated using the work spaces 230a through 230c until the generation of RAW data is completed by the invoked remote drivers 250A through 250C. Note that if job data have both the data of the lower image format and that of the higher image format, the drawing processor and the remote drivers 250A through 250C are invoked as required to execute the processing. With the above configuration, the transmission processing unit 240 can provide excellent outputs of the remote printers 122, 124, 126, and 128, while securing consistency between data for all the jobs.

Moreover, a description is made of the configuration of the transmission processing unit 240 exemplifying the private instance 240a. Note that the private instances 240b and 240c have the same configuration as that of the private instance 240a.

The private instance 240a includes the transmission destination control unit 242 and the print instruction unit 244. By referring to the corresponding table 246, the transmission destination control unit 242 acquires transmission destination information associated with a print request source from the job information 232 separated and extracted from job data by the data extraction unit 222. Then, the transmission destination control unit 242 notifies the print instruction unit 244 of the acquired transmission destination information, process ID, and job information 232. The print instruction unit 244 invokes the remote driver 250A or the like as the transmission destination of output data in response to the notification from the transmission destination control unit 242. Then, after the print instruction unit 244 transmits the output data to the remote driver 250A, the transmission destination control unit 242 transmits an instruction for displaying the transmission destination information and/or the print information together with the process ID to the display unit 248.

Further, the transmission destination control unit 242 changes the transmission destination of output data depending on a client, a user or the like as a print request source. In addition, the transmission destination control unit 242 can change the transmission destination of output data based on print setting information and the job information 232 contained in the job data by referring to a data table in which the performance information of a printer such as a print processing speed is stored in advance.

Upon receiving a process ID, transmission destination information, and job information 232 from the transmission destination control unit 242, the print instruction unit 244 newly registers the received process ID in the transmission management table, acquires print information from the job information 232, and sets the transmission destination information and the print information in a record corresponding to the process ID. In this embodiment, examples of the print information include user information for specifying a user who has issued a print job; terminal information such as an IP address and a computer name for specifying the terminal used by the user; print setting information such as color, monochrome, and gray scale; print setting information such as double-sided printing, one-sided printing, and page layouts; and job information such as a document name, a page number, and output contents. Note that the transmission management table is described in detail below.

The print instruction unit 244 transmits the generated transmission management table to a transmission processing unit such as a port monitor. The transmission management table can be printed and output from any of the remote printers 122, 124, 126, and 128 as a transmission destination designated by a process ID.

In another embodiment, when the print instruction unit 244 generates the transmission management table, the display unit 248 displays a print information dialogue as a user interface for displaying print information on a client computer associated with a process ID. With this dialogue, the client can issue a print continuation instruction or a print cancellation instruction. Then, when the display unit 248 receives the print continuation instruction from the client, the print instruction unit 244 transmits output data to the corresponding remote printer 122, 124, 126, or 128. On the other hand, when the display unit 248 receives the print cancellation instruction from the client, the print instruction unit 244 deletes the output data received from the corresponding work space 230a, 230b, or 230c to cancel print processing, and the display unit 248 displays a print processing cancellation dialogue or the like for reporting the cancellation of print processing to the client.

The print information dialogue includes, for example, a dialogue for notifying a user of the fact that a print job to be executed represents color printing and urging the user to change from color printing to monochrome printing, a dialogue for urging the user to perform printing with a laser printer capable of performing high-speed printing in order to deal with many sheets to be output, a dialogue for urging the user to perform double-sided printing, a dialogue for urging the user to change a page layout, and a dialogue for just notifying the user of a transmission destination to which a printed matter is output and print information such as the number of print sheets.

These dialogues can be displayed so as to correspond to any user and client in such a manner that the print instruction unit 224 determines the user, for which the dialogues should be displayed, by using user information configured to determine the title of the user or the like. Therefore, for example, employees higher in position than a manager are allowed to perform color printing and one-sided printing, while the remaining employees are urged to perform both monochrome printing and double-sided printing and change a page layout.

In another embodiment, the print instruction unit 244 can select a remote printer corresponding to the number of print sheets by referring to a data table in which performance information such as the processing speed of the remote printer is registered, and displays a dialogue for urging the remote printer to execute printing or reporting the execution of printing on a print request source through the display unit 248 described below. Thus, it is possible to urge a user to execute printing through an optimum remote printer or cause the printer to execute printing.

Moreover, the private instance 240a includes the display unit 248. The display unit 248 is a function processing unit that notifies the clients 112, 114, 116, and 118 as print request sources of transmission destination information and/or print information for the jobs. Upon receiving print-request-source information and a process ID from the print-request-source notification unit 216 of the application execution unit 212, the display unit 248 registers the print-request-source information and the process ID in a display destination management table. In the display destination management table, the print-request-source information is registered in association with the process ID.

Further, upon receiving an instruction for displaying transmission destination information and/or print information together with a process ID from the transmission destination control unit 242, the display unit 248 acquires the transmission estimation information and/or the print information associated with the process ID by referring to a transmission management table 500, and then displays these information items on the corresponding one of the clients 112, 114, 116, and 118 as a print request source. Thus, a user can be notified of the transmission destination and the print information automatically determined by the transmission processing unit 240.

In this embodiment, one of the display units 248 is mounted for each of the private instances. However, in another embodiment, the display unit 248 can be configured to be separated from the transmission processing unit 240 and collectively perform the above notification processing of all the private instances. In this case, the transmission processing unit 240 transmits an instruction for displaying transmission destination information and/or print information to the display unit 248 together with a process ID, and the display unit 248 displays the transmission destination information and/or the print information on a print request source.

In this embodiment, it is preferable to transmit a job in a format including higher image data as much as possible to the virtual printer driver 218. This is because when the image data as the higher image data are transmitted, it becomes possible to reduce a data amount per image particularly on a color image and eventually allow the data processing unit 210 to deal with more print requests.

Figure 3:
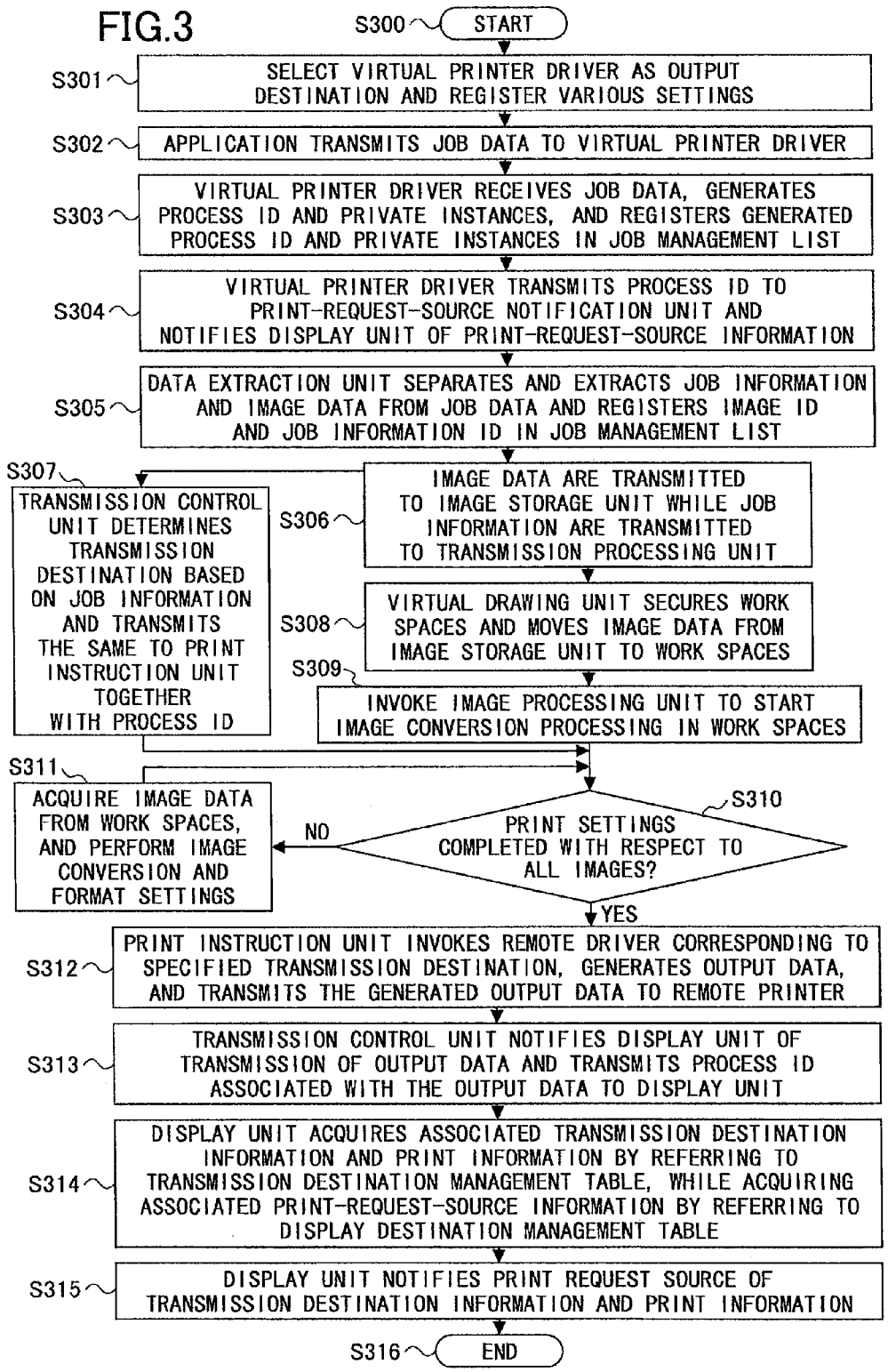
FIG. 3 is a flowchart of the processing executed by the data processing apparatus 110 according to the embodiment.

FIG. 3 is a flowchart of the processing executed by the data processing apparatus 110 according to this embodiment. The processing shown in FIG. 3 starts from step S300. In step S301, the virtual printer driver 218 is selected, and various settings are registered. Note that the manager or the like of the data processing apparatus 110 can perform this registration with a dedicated GUI. In step S302, the application 214 gives job data to the virtual printer driver 218 in response to a request from any of the clients 112, 114, 116, and 118. In step S303, the virtual printer driver 218 receives the job data from the application 214, generates a process ID (PID) and one of the private instances 240a through 240c of the transmission processing unit 240 for the job involved, and registers the generated process ID and the one of the private instances 240a through 240c in the field of the corresponding one of the job management lists 238a through 238c. In step S304, the virtual printer driver 218 transmits the process ID to the print-request-source notification unit 216 to notify the display unit 248 of print-request-source information.

In step S305, the data extraction unit 222 separates the job information 232 and the image data 234 from the job data, generates a job information ID (JID) and an image ID (IMGID), and registers these generated IDs in the job management list 238a. Then, in step S306, the data extraction unit 222 transmits the image data 234 to the job storage unit 226 while transmitting the job information 232 to the transmission processing unit 240 of the corresponding private instance.

In step S307, in parallel with image conversion processing by the image processing unit 236, the transmission destination control unit 242 of the transmission processing unit 240 determines a transmission destination based on the job information 232 by referring to the corresponding table and transmits the determined transmission destination to the print instruction unit 244 together with the process ID.

In step S308, the virtual drawing unit 224 generates one of the work spaces 230a through 230c, moves the image data 234 from the job storage unit 226 to one of the work spaces 230a through 230c. In step S309, the image processing unit 236 is invoked to start image conversion processing using the job information 232. Note that the image conversion includes processing such as image imposing, change of print sizes and margins, and conversion of lower image format data into higher image format data.

In step S310, it is determined whether the image processing by the image processing unit 236 has been completed. If the image processing has not been completed (no), the image data are acquired from the one of the work spaces 230a through 230c in step S311 and the processing is repeated in the one of the work spaces 230a through 230c until the image conversion and the format settings are completed with respect to all the images being processed. After the image conversion processing has been completed with respect to all the image data (yes), the print instruction unit 244 invokes the remote driver corresponding to the transmission destination allocated to the process ID to generate output data by looking up the transmission management table in step S312. Then, the print instruction unit 244 transmits the generated output data to the remote printer as a target through, for example, a port monitor. Note that before transmitting the output data to the data transmission unit 244, the remote driver 250A may add a PDL or the like to the image-converted output data to transmit the output data to the targeted remote printer.

In step S313, the transmission destination control unit 242 of the transmission processing unit 240 notifies the display unit 248 of the fact that the output data have been transmitted to the remote printer, while transmitting the process ID associated with the output data to the display unit 248. In step S314, the display unit 248 acquires transmission destination information and/or print information associated with the received process ID by referring to the transmission management table 500, while acquiring print-request-source information associated with the received process ID by referring to the display destination management table. In step S315, the display unit 248 notifies the client as a print request source of the transmission destination information and/or the print information. In step S316, the processing shown in FIG. 3 is ended.

In this embodiment, the image processing unit 236 may have the function of generating image data contained in job data as the data of a higher image format. Further, the remote drivers 250A through 250C are automatically acquired by a plug-and-play function such as UPnP or Bonjour. Accordingly, a page printer is not limited to one by a specific manufacturer of a specific mounting format, but it is possible to perform the processing with a page printer which is only connected to the printer network 100 and allowed to use a plug-and-play function, namely an automatic driver transfer protocol.

FIG. 4 shows the corresponding table 400 managed by the transmission destination control unit 242 according to this embodiment. With the corresponding table 400 shown in FIG. 4, the manager of the data processing apparatus 110 can perform an input by using an appropriate database.

In a corresponding table 400A, IP addresses input by clients as identification values for identifying output request sources such as the clients 112, 114, 116, and 118 and printer names allocated to the IP addresses as output-destination printer information are registered in association with each other. Note that the IP addresses are not limited to the single values as shown in the corresponding table 400A, but can be in the range specified by a subnet mask or the like so as to correspond to a specific group.

In a corresponding table 400B, the user names read from IC cards or the like as the identification values of output request sources and the printer names for inherently identifying the remote printers including the local printer A or the like are registered in association with each other. In another embodiment, login user IDs or the like can be used as the identification values of output request sources. Note that in the embodiment in which the output destinations are managed in association with the user names, an output destination printer can be specified corresponding to a user regardless of which client the user accesses. Accordingly, when the user issues a print job through a different client, he/she can reliably transmit print data to a prescribed output destination without inputting a change in printer settings to the client. Therefore, it is possible to improve efficiency in operability and ensure the security of a document.

Further, in this embodiment, if the same user operates with a different client, he/she can output data to a different output destination printer by linking an IP address allocated to the client to a user name or the like.

In a corresponding table 400C, output contents are combined with the identification values such as the user names or the like so that output destinations are linked to each other. In the corresponding table 400C, plural network printers are allocated to a single user name (in this embodiment, the user 3). In other words, local printers C and D, which are printer names as destination printer information, are allocated.

In this embodiment, the output contents include, for example, form printing, label printing, and color printing. Printers have different functions depending on their machine model and manufacture, and formats and output functions of forms are different depending on the printers. Therefore, the output contents are used for controlling the output destinations based on these differences. Note that the output contents may be given as job information 232 from the application, or the data processing apparatus 110 may determine them by using the metadata of the job information 232. Further, when plural remote printers are allocated to a single identification value (in this embodiment, the user 3), it is possible to select a printer name registered at an upper level as a default. That is, it is possible to perform printing with an interactively-specified remote printer by querying the clients 112, 114, 116, and 118.

FIG. 5 shows the transmission management table 500 used in this embodiment. The transmission management table 500 is used when the display unit 248 displays transmission destination information and/or print information on a client as a print request source. In the transmission management table 500 shown in FIG. 5, process IDs, transmission destination information, and various print information items are registered in association with each other. In this embodiment, the transmission management table 500 is collectively managed by the print instruction unit 244. In another embodiment, the image processing unit 236 can also manage the transmission management table as its job information 232, and any module can appropriately manage, generate, and update the transmission management table in accordance with a specific purpose and mounting format.

In the transmission management table 500, the process ID generated when the application 214 makes a request for a job to the virtual printer driver 218, e.g., PID__0001 is registered. The application execution unit 212 notifies the transmission processing unit 240 of the value of the process ID together with a print instruction. The transmission destination control unit 242 of the transmission processing unit 240 determines a transmission destination by querying the corresponding table 400 while using job information 232, and transmits the process ID, corresponding transmission destination information, and job information 232 to the print instruction unit 244.

Further, in the transmission management table 500, the transmission destination information that the print instruction unit 244 has received from the transmission destination control unit 242 is registered. In this embodiment, the names of remote printers are registered as the transmission destination information. However, in another embodiment, IP addresses may be used instead.

Moreover, in the transmission management table 500, print information contained in the job information 232 that the print instruction unit 244 has received from the transmission destination control unit 242 is registered. The print information includes user information, terminal information, print setting information, and job information. In the embodiment shown in FIG. 5, user names are registered as the user information, and the IP addresses of the terminals of the users are registered as the terminal information. In addition, information for specifying colors such as color, monochrome, and gray scale is registered as the print setting information, and the number of pages of output data is registered as the job information.

FIG. 6 shows the display destination management table. The display destination management table 600 is used when the display unit 248 displays transmission destination information and/or print information on a client as a print request source. In the display destination management table 600 shown in FIG. 6, process IDs and print-request-source information are registered in association with each other.

As described above, a process ID is information for inherently identifying a job. In this embodiment, PID_001, PID_002, and PID_003 are registered as process IDs. Note that in another embodiment, any type of identification information is available so long as a job can be inherently identified.

As described above, print-request-source information is information for specifying a print request source, and includes login user IDs, user rights, and session IDs. The login user ID is a login user ID of a user used when the user logs into a client. The user right refers not only to information on the right of the user when he/she logs into the client but also to an access right required when the display unit 248 displays transmission destination information and print information on the client. The session ID is identification information for specifying the program execution space of the session that has issued a print instruction from a client. In this embodiment, the display unit 248 transmits the same access right as that of the client as a print request source to the session specified by the session ID together with an instruction for displaying transmission destination information or the like. As a result, the transmission destination information or the like is displayed on the client. In this case, prior to the transmission of the instruction for displaying the transmission destination information or the like, the access right is changed to the user right of the client.

The display unit 248 registers the print-request-source information and the process ID received from the print-request-source notification unit 216 of the application execution unit 212 in the display destination management table 600. In the display destination management table 600 shown in FIG. 6, the access right is changed to suit the program execution space specified by the session ID, thereby making it possible to display transmission destination information or the like on a client as a print request source. Note that in this embodiment, the transmission processing unit 240 including the display unit 248 is executed with a substantially high right, and the access right can be changed to suit a user having any right. Thus, such information is identified as the print-request-source information. However, in another embodiment, it may include information required to be displayed on a client as a print request source.

Figure 7:
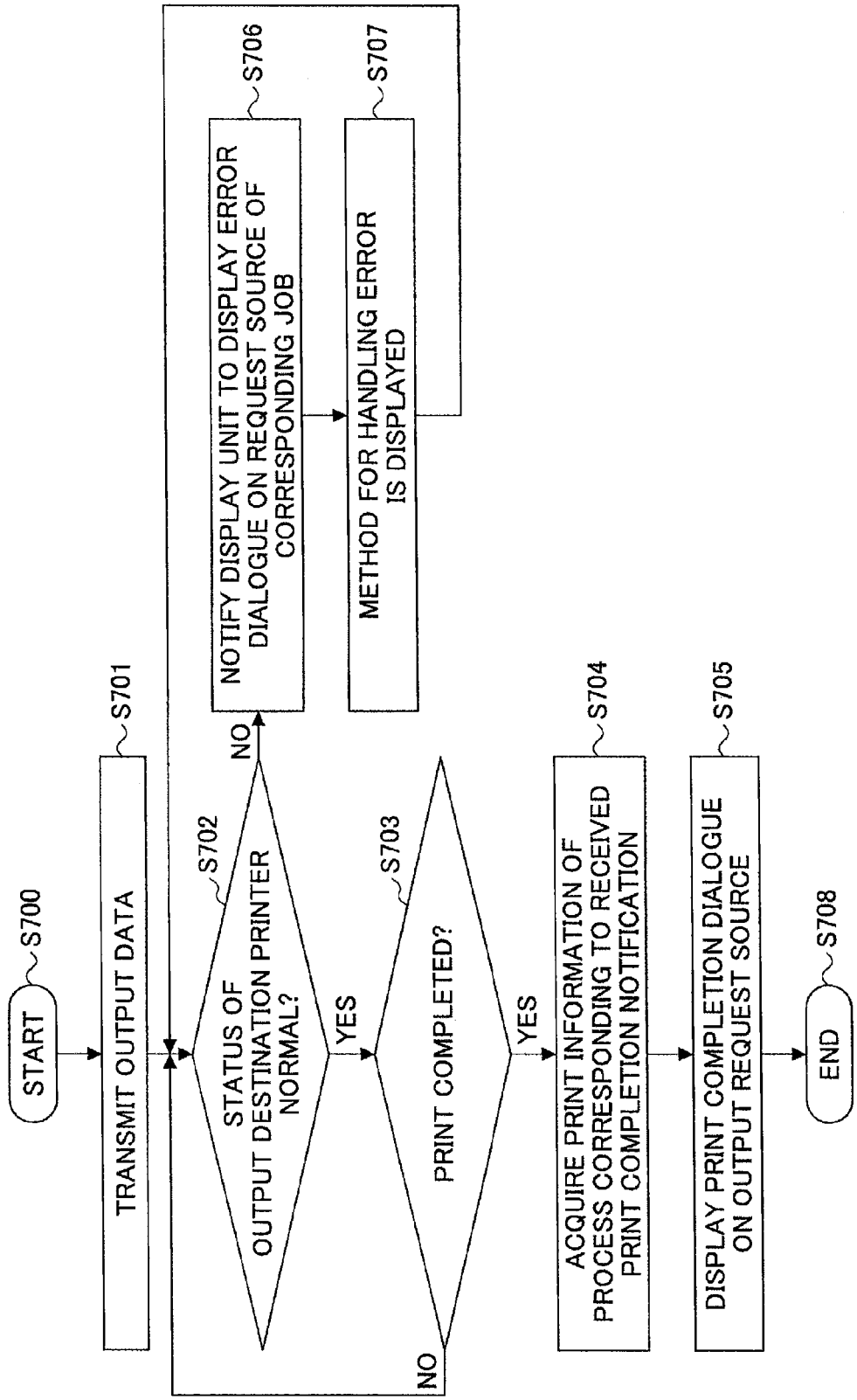
FIG. 7 is a flowchart of the processing when the data processing apparatus 110 according to the embodiment monitors a printer status.

FIG. 7 is a flowchart of the processing when the data processing apparatus 110 according to another embodiment monitors a printer status and reports transmission destination information and print information. The virtual printer driver 218 exists during a period in which any of the work spaces 230a through 230c for a process ID managed by the virtual printer driver 218 exists, and manages the generation of the processing in the work spaces 230a through 230c, the deletion of resource allocation on a hardware resource, or the like. At the same time, by using a SNMP protocol, the virtual printer driver 218 monitors the status information of a remote printer corresponding to the process ID managed by the virtual printer driver 218. Note that in this embodiment, the virtual printer driver 218 has the function of monitoring a remote printer. However, in another embodiment, the transmission processing unit may have the function of monitoring a remote printer.

The processing shown in FIG. 7 starts from step S700. In step S701, RAW data are generated, and a PDL command is added to the RAW data. Then, output data containing the RAW data are transmitted to an output destination printer. In step S702, it is determined whether the status of the output destination printer is normal. If the status is determined to be normal in step S702 (yes), it is then determined in step S703 whether a print completion notification has been received from the output destination printer.

If printing has not been completed (no), the processing returns to step S702 so that the status of the output destination printer is continuously checked until the print completion notification is received. Note that the processing of the data processing apparatus 110 can be directly checked in such a manner that the data processing apparatus 110 serves as a SNMP master and the output destination printer serves as a SNMP slave. When detecting a change in the status, the data processing apparatus 110 uses a SNMPtrap command. Further, the data processing apparatus 110 acquires the status when the output destination printer releases it to the public by using a MIB.

On the other hand, if the status of the output destination printer is determined to be abnormal in step S702 (no), the data processing apparatus 110 displays an error dialogue on the corresponding one of the clients 112, 114, 116, and 118 in step S706. If the virtual printer driver 218 detects abnormality in the status of the output destination printer, the data processing apparatus 110 invokes the display unit 248 to display a printer status dialogue that reports the abnormality in the status of the output destination printer. The display unit 248 transfers the printer status dialogue to the corresponding one of the clients 112, 114, 116, and 118 as print request issuance sources if the data processing apparatus 110 functions as the SNMP manager of the clients 112, 114, 116, and 118. Further, if the data processing apparatus 110 is configured as an application server managed by a manager, it can display the printer status dialogue on its desktop.

Therefore, the data processing unit 210 activates a SNMP manager service. Upon receiving a trap command, the data processing unit 210 checks the MIB (Management Information Base) released to the public by the remote printer, invokes the display unit 248 to display an error dialogue on the desktop screen of an appropriate information processing apparatus, and displays text or the like for displaying a method for handling the error on the error dialogue in step S707. Afterward, the processing returns to step S702 where the remaining data of a document file are held until the status of the printer causing the error becomes normal so as to secure the completion of the processing.

If the status of the output destination printer becomes normal and the data processing apparatus 110 receives the notification of print completion in step S703, the virtual printer driver 218 queries the display unit 248 in step S704, specifies a transmission destination based on information for specifying a remote printer included in the received notification of print completion, such as an IP address and a printer name, and acquires the process ID and the print information of the print job executed by the transmission destination by referring to the transmission management table 500. In step S705, the display unit 248 specifies a corresponding print request source by referring to the display destination management table and displays a print completion dialogue reporting the print completion on the desktop screen of the print request source. In step S708, the processing is ended, and the checking of the status is completed. In the print completion dialogue, not only the notification of the print completion but also the transmission destination information and/or the print information can be displayed.

Figure 8:
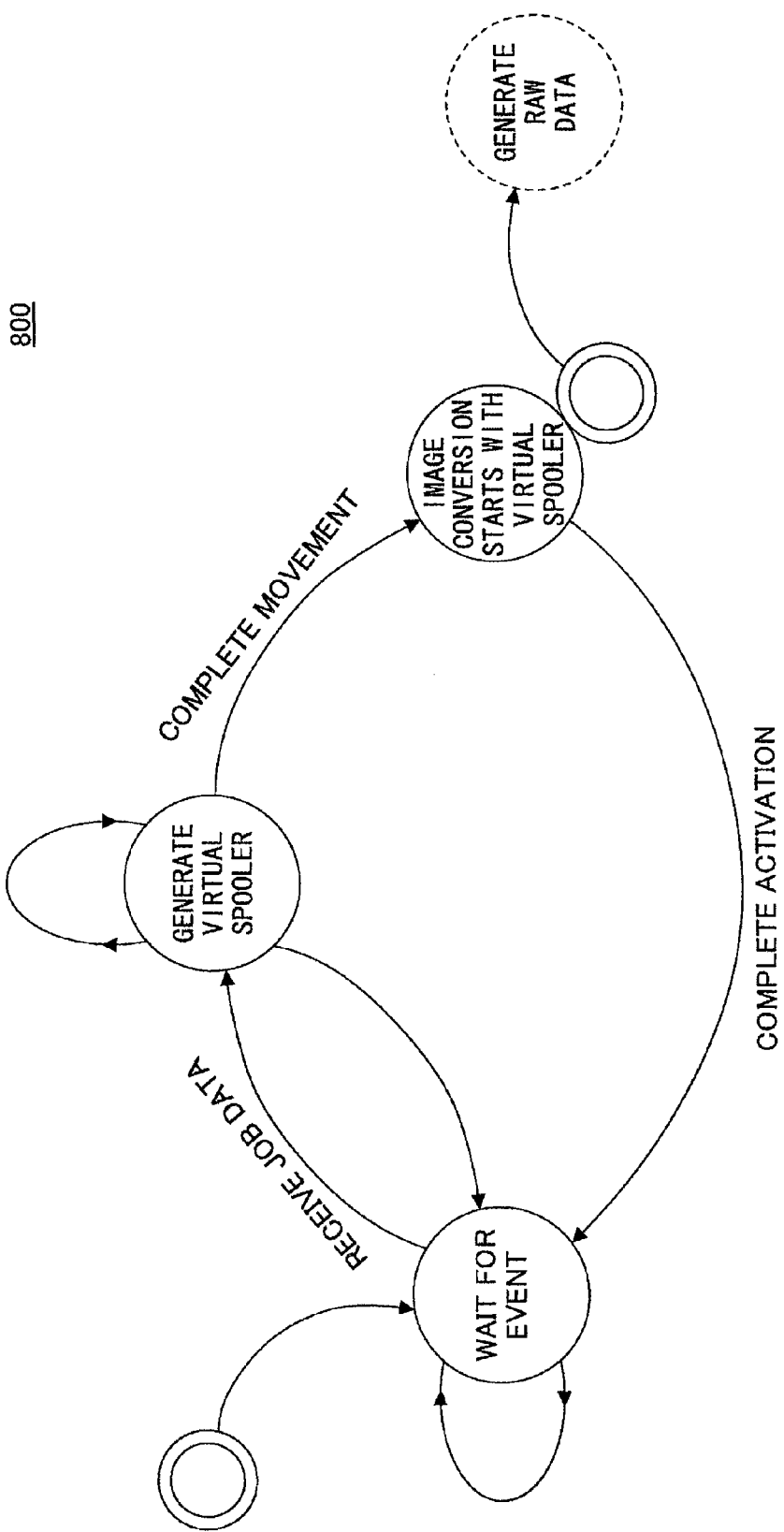
FIG. 8 shows a status transition 800 of a data processing unit 210 according to the embodiment.

FIG. 8 shows a status transition 800 of the data processing unit 210 according to this embodiment. The data processing unit 210 transitions to an event standby status for receiving a job from the application 214. After receiving the job, the data processing unit 210 invokes the virtual drawing unit 224 and generates one of the work spaces 230a through 230c, which is associated with a process ID and referred to as a virtual spooler, for any job in the embodiment described. Then, the data processing unit 210 moves the data of the job storage unit 226 to the generated one of the work spaces 230a through 230c. When the movement of the data is completed, image conversion processing using the virtual spooler is started. The movement processing can be executed as MOVE or COPY/DELETE processing from the job storage unit 226 to one of the work spaces 230a through 230c. When the movement of the image data to one of the work spaces 230a through 230c is completed, the data processing unit 210 transitions to the event standby status for dealing with a new job.

On the other hand, the image data moved to the virtual spooler are subjected to the image conversion processing by the image processing unit 236, transmitted to processing for generating output data as RAW data, and input to data transmission processing by the print instruction unit 244. Thus, the image data are capable of being printed by a remote printer.

As shown in FIG. 8, the data processing apparatus 110 according to this embodiment can move the data of the job storage unit 226 to any of the work spaces 230a through 230c at high speed without executing processing for drawing higher image data, withdraw the exclusive management of the image processing unit 236 by the application 214 when the movement of the data is completed so as to create a standby status for the next print instruction event by the application execution unit 212. Accordingly, control can be immediately returned to the application execution unit 212. As a result, it is possible for the data processing unit 210 to transition to the event standby status immediately after the generation of any of the work spaces 230a through 230c. Therefore, a higher capacity for processing a job can be provided while ensuring the security of printing a document.

Figure 9:
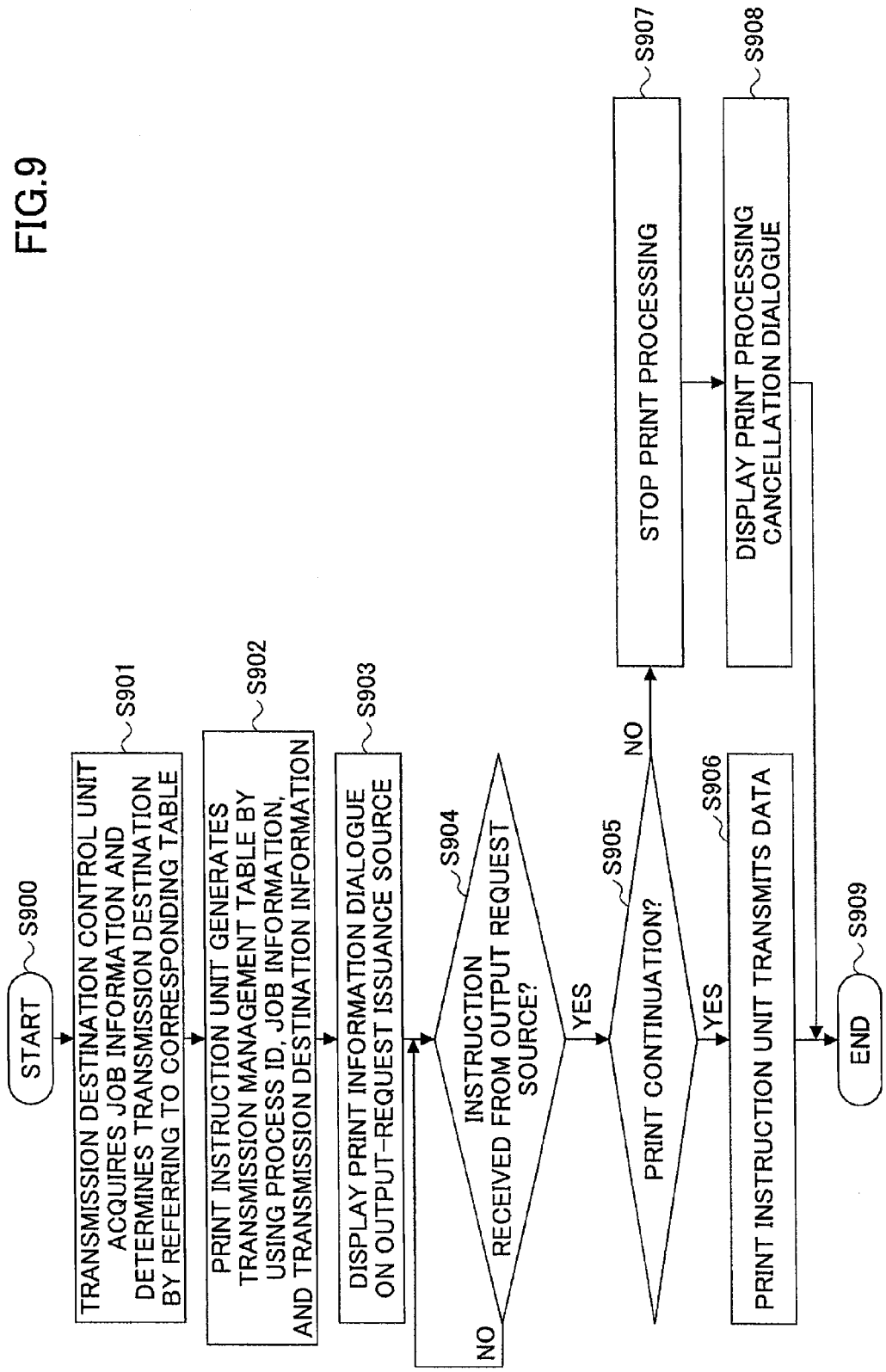
FIG. 9 is a flowchart of the processing when the data processing apparatus 110 according to another embodiment displays transmission destination information and/or print information.

FIG. 9 is a flowchart of the processing when the data processing apparatus 110 according to another embodiment displays transmission destination information and print information on a client by using the transmission management table before causing a remote printer to execute print processing.

The processing of FIG. 9 starts when the transmission processing unit 240 of the data processing apparatus 110 receives a print instruction and a process ID from the application execution unit 212. The processing of FIG. 9 starts in step S900. In step S901, the transmission processing unit 240 invokes the transmission destination control unit 242, and then the transmission destination control unit 242 acquires job information 232 and determines a transmission destination by referring to the corresponding table 400. In step S902, the print instruction unit 244 receives a process ID, job information 232, and transmission destination information associated with the transmission destination, and registers the process ID, the job information 232, and print information contained in the job information 232 in the transmission management table 500. In step S903, the print instruction unit 244 determines a print information dialogue to be displayed based on the transmission management table 500, and displays the print information dialogue on a corresponding print request source.

In step S904, the print instruction unit 244 determines whether the print instruction unit 244 has received an instruction from the print request source. If the print instruction unit 244 has not received the instruction from the print request source (no), the processing is repeated. On the other hand, if the print instruction unit 244 has received the instruction from the print request source (yes), the processing proceeds to step S905. In step S905, the print instruction unit 244 determines the instruction from the output request source. If the instruction refers to print continuation (yes), the processing proceeds to step S906. In step S906, the print instruction unit 244 transmits output data to a remote printer associated with the process ID as a target through, for example, a port monitor by looking up the transmission management table. Then, in step S909, the processing is ended. Note that before transmitting the output data to the data transmission unit 244, the remote driver can add a PDL or the like to the image-converted output data to transmit the output data to the targeted remote printer.

On the other hand, in step S905, if it is determined that the instruction from the output request source does not refer to the print continuation, i.e., if it is determined that the instruction from the output request source refers to print cancellation (no), the processing proceeds to step S907. In step S907, the print instruction unit 244 stops the print processing. In step S908, the print instruction unit 244 displays a print cancellation dialogue on the client as the output request source. In step S909, the processing is ended.

Figure 10:
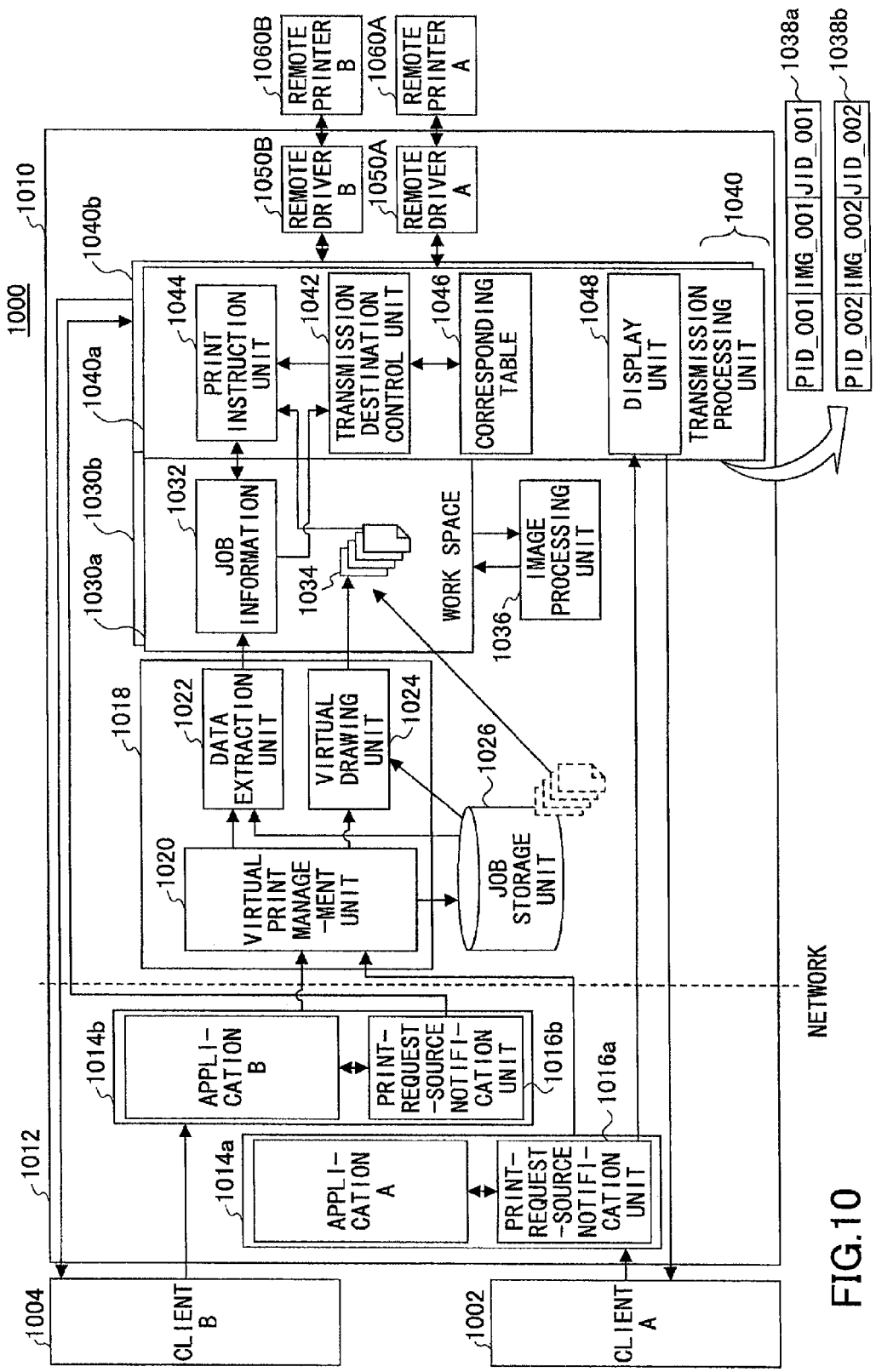
FIG. 10 is a block diagram showing a function block 1000 of the data processing apparatus according to another embodiment.

FIG. 10 is a block diagram showing a function block 1000 of a data processing apparatus according to another embodiment. Note that function units shown in FIG. 10 having the same function as the function units shown in FIG. 2 are denoted by the same numerals in their last two digits. The function block 1000 is described below focusing on differences between the function block 1000 and the function block 200 shown in FIG. 2.

FIG. 10 shows the function block 1000 of the data processing apparatus 1010 to which plural clients are connected. In the data processing apparatus 1010, an application A 1014a and an application B 1014b of an application execution unit 1012 operate so as to correspond to a client A and a client B, respectively. The application A 1014a has a print-request-source notification unit 1016a, and the application B 1014b has a print-request-source notification unit 1016b. The print-request-source notification units 1016a and 1016b receive print-request-source information from the client A 1002 and the client B 1004, respectively, and transmit the print-request-source information and process IDs to display units 1048 of transmission processing units 1040a and 1040b generated as private instances for each job data set. Then, the display units 1048 display transmission destination information and/or print information on the client A 1002 and the client B 1004 as print request sources.

As described above, according to the embodiment of the present invention, under a present network print environment in which a personal computer and a thin client are allowed to access plural image forming apparatuses, it is possible to provide a data processing apparatus capable of outputting printed matter from a client connected through a network with the same printer at any time by using user information and client information and capable of improving efficiency in management for output operations and information security. Further, it is possible to provide a program and a storage medium used for the data processing apparatus. In addition, according to the embodiment of the present invention, it is possible to provide a data processing apparatus capable of controlling an output destination at minimum cost without adding an application module to an application server. Further, it is possible to provide a program and a recording medium used for the data processing apparatus.

Moreover, according to the embodiment of the present invention, it is not required to add to a thin client the printer driver of a remote printer where printing is to be performed. Thus, it is possible to provide a data processing apparatus capable of managing an output destination for a print output while conforming to a more flexible network. Further, it is possible to provide a printer network system, a data processing method, a program, and a storage medium used for the data processing apparatus.

The above functions of this embodiment can be implemented by an apparatus-executable program described in an object-oriented programming language such as C, C++, C#, and Java™. Further, the program of this embodiment can be distributed while being stored in an apparatus-readable recording medium such as a CD-ROM, a MO, a DVD, a flexible disk, an EEPROM, and an EPROM, and can be transmitted through a network in a format capable of being executed by other apparatuses.

The present invention is not limited to the specifically disclosed embodiments, and variations and modifications may be made without departing from the scope of the present invention.

What is claimed is:

1. A method used in an information processing apparatus requesting an output apparatus for printing, the method comprising:
   a first printing step including:
      receiving print data from an application,
      storing the received print data in a predetermined storage area, and
      controlling the information processing apparatus so as to give a notice to the application of completion of an image process performed on the print data stored in the predetermined storage area, and the notice indicates that it is possible to start processing new print data without waiting; and
   a second printing step including:
      allocating the print data in accordance with an output-destination, the print data corresponding to the given notice of ending the process performed on the print data stored in the predetermined storage area,
      receiving the print data allocated to receive allocated print data,
      converting the received print data into data that is processable by the output apparatus, and
      controlling the information processing apparatus so as to transmit the converted data to the output apparatus.

2. The method according to claim 1,
   wherein, in the allocating, one output-destination is determined from plural output-destinations as an output-determination of the print data.

3. The method according to claim 1,
   wherein the receiving the print data from the application, the storing, and the controlling the information processing apparatus so as to give the notice are performed by a virtual printer driver, and
   wherein the virtual printer driver is configured to generate an instance for the allocating for each of the printing data.

4. The method according to claim 3,
   wherein the allocating, the receiving the print data allocated, the converting, and the controlling the information processing apparatus so as to transmit the converted data are performed by the instance and a remote driver.

5. The method according to claim 1,
   wherein the application is a client application.

6. A non-transitory computer-readable recording medium having recorded therein a program that causes a computer to execute a method used in an information processing apparatus requesting an output apparatus for printing, the method comprising:
   a first printing step including:
      receiving print data from an application,
      storing the received print data in a predetermined storage area, and
      controlling the information processing apparatus so as to give a notice to the application of completion of an image process performed on the print data stored in the predetermined storage area, and the notice indicates that it is possible to start processing new print data without waiting; and
   a second printing step including:
      allocating the print data in accordance with an output-destination, the print data corresponding to the given notice of ending the process performed on the print data stored in the predetermined storage area,
      receiving the print data allocated to receive allocated print data,
      converting the received print data into data that is processable by the output apparatus, and
      controlling the information processing apparatus so as to transmit the converted data to the output apparatus.

7. The non-transitory computer-readable recording medium according to claim 6,
   wherein, in the allocating, one output-destination is determined from plural output-destinations as an output-determination of the print data.

8. The non-transitory computer-readable recording medium according to claim 6,
   wherein the receiving the print data from the application, the storing, and the controlling the information processing apparatus so as to give the notice are performed by a virtual printer driver, and
   wherein the virtual printer driver is configured to generate an instance for the allocating for each of the printing data.

9. The non-transitory computer-readable recording medium according to claim 8,
   wherein the allocating, the receiving the print data allocated, the converting, and the controlling the information processing apparatus so as to transmit the converted data are performed by the instance and a remote driver.

10. The non-transitory computer-readable recording medium according to claim 6,
   wherein the application is a client application.

* * * * *